April 20, 1965 N. U. VAUDREUIL 3,179,372
GATE VALVE
Filed Feb. 14, 1963
2 Sheets-Sheet 1
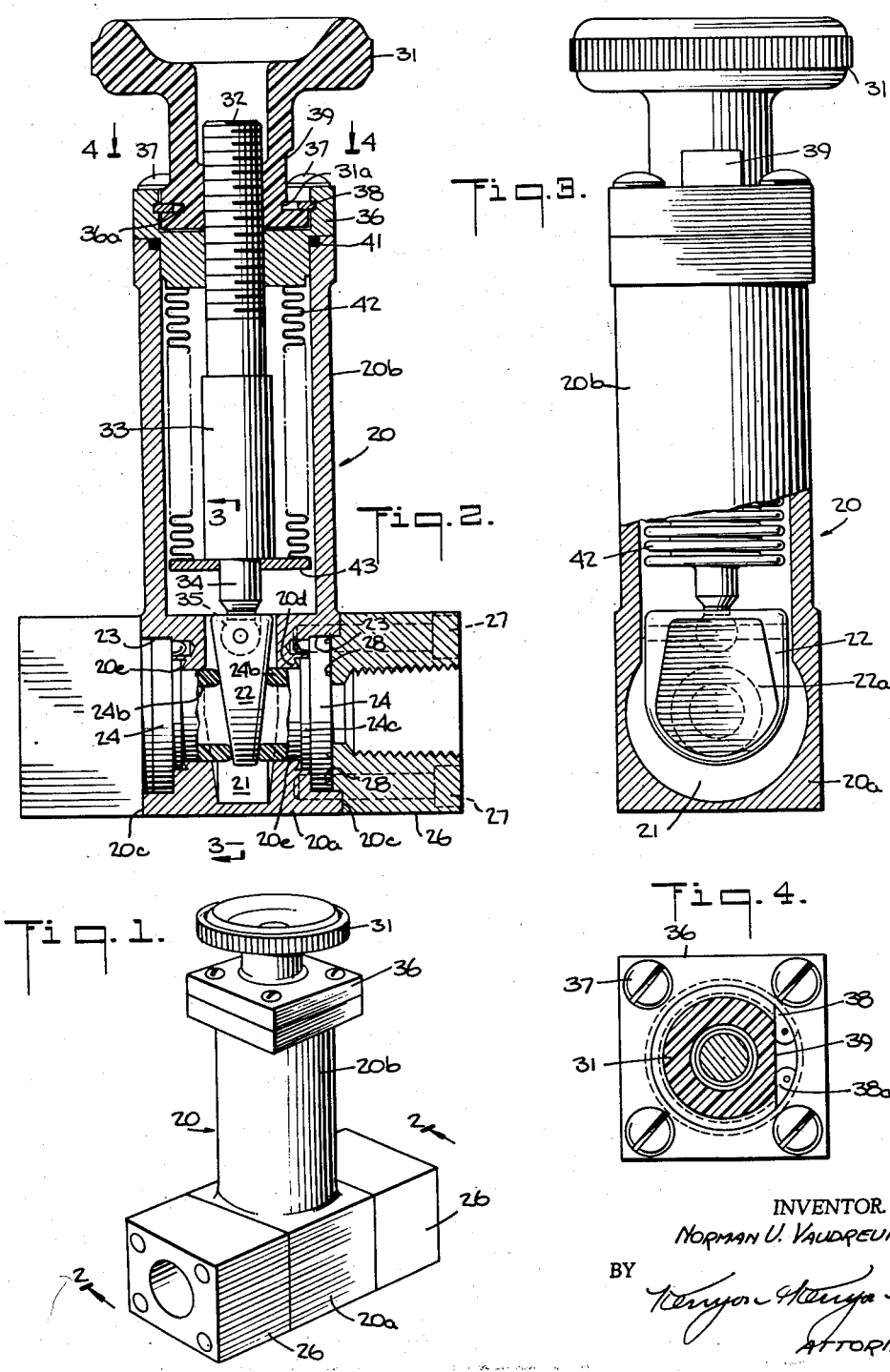
INVENTOR.
NORMAN U. VAUDREUIL
BY
ATTORNEYS

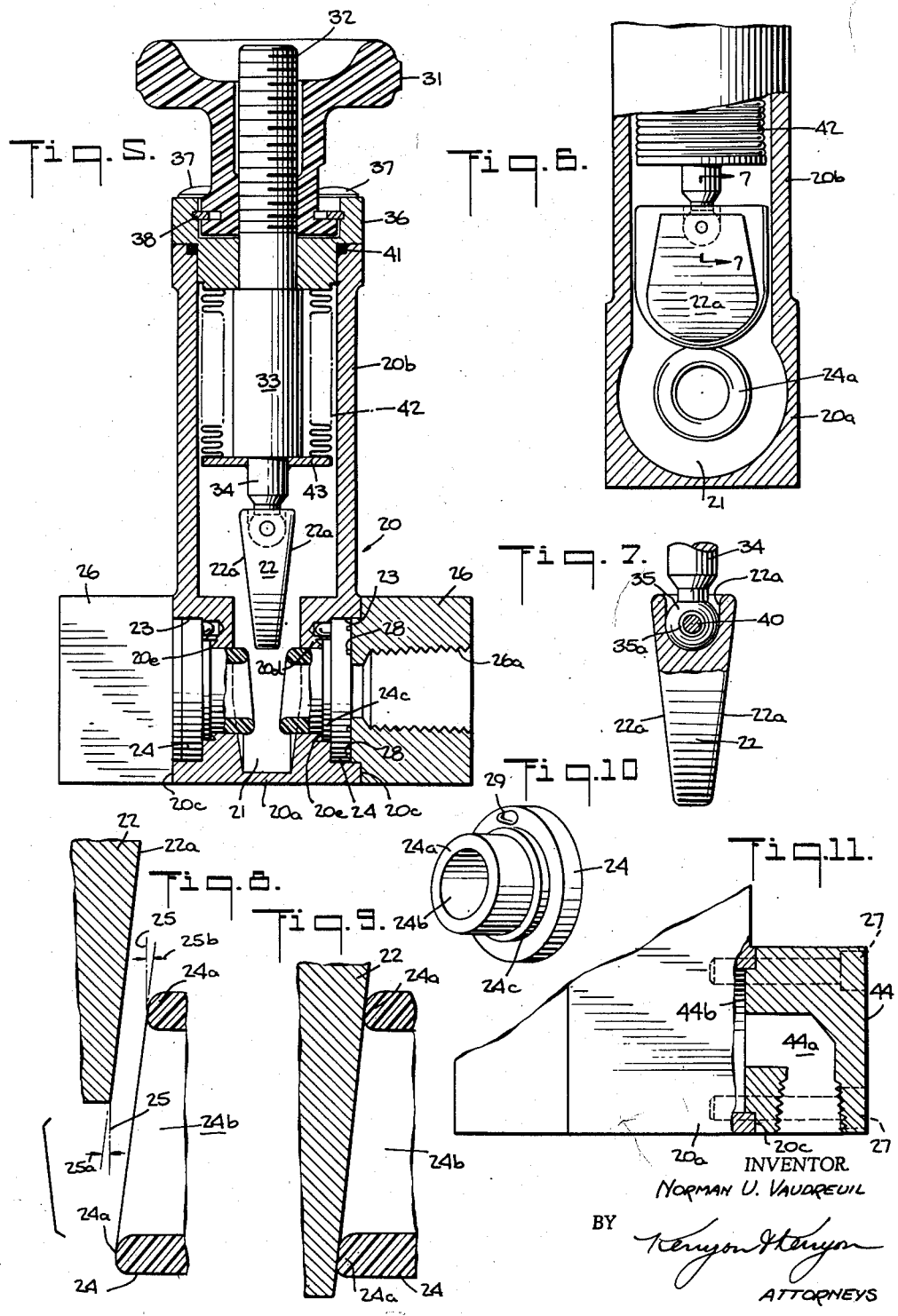

United States Patent Office 3,179,372
Patented Apr. 20, 1965

3,179,372
GATE VALVE
Norman U. Vaudreuil, 16 Spring Valley Road,
Worcester, Mass.
Filed Feb. 14, 1963, Ser. No. 258,424
2 Claims. (Cl. 251—328)

This invention relates to a gate valve and more particularly to a gate valve which can be tightly closed to provide an effective seal and subsequently reopened without the need of an excessive opening force.

Gate valves employing wedge-shaped gates have commonly been used. By forming the gate in the shape of a wedge and by positioning one or a spaced pair of valve seats adjacent the wedge at an angle corresponding to the wedge angle, the valve member or gate can be closely engaged with respect to the seat or seats when the valve is closed. Due to the wedging action it is possible to simply develop high closure forces between the surfaces of the gate and the adjacent surface of the seat. Thus this arrangement enables the gate to be moved along a straight line into engagement with the seat and due to the mechanical advantage of the wedge-shaped gate it enables the gate to be urged tightly against the seat to provide an effective seal.

Whenever a gate valve having a wedge-shaped gate is used in a system having relatively high fluid pressures it is customary for the human operator by means of the valve handle to close the valve as tightly as possible in order to prevent leakage. In the case of a power operated valve the actuator is designed to apply a substantial closing force to the gate to insure a good seal. In such prior art wedge-shaped gate valves the wedge angle of the gate and the wedge angle presented to it by the seat or seats are equal and usually of a magnitude of about 5° with respect to their central axis so that a substantial wedging effect occurs upon tight closure of the valve. Thus as the gate is driven into engagement with the seat, sufficient force is applied to it to elastically deform the gate and seat and thereby insure a pressure type seal even though the surfaces of these parts may have minor variations, wear marks, and the like. Due to the tight wedging condition which results upon firmly closing the valve, the valve can subsequently be reopened only upon the application of substantially greater force than that used to close it. Often-times it is found that it is impossible to open a valve by hand that has been previously been tightly closed. Difficulty in opening the valve can be further aggravated by changes in temperature of the valve after closing and when the valve has been left in the closed position for a prolonged period of time.

It is believed that one of the chief causes of the difficulty in opening a tightly closed wedge-shaped gate valve results from the fact that whenever the gate and seat arrangement have an equal wedge angle, the elastic deformation which accompanies tight closing sufficiently distorts the engaged parts in a manner which greatly increases the required opening force.

Another difficulty experienced with gate valves in which the wedge and seat arrangement have the same wedge angle is that the valve may not necessarily provide an effective seal at elevated pressure or high vacuum conditions. Consequently, because of their inability to provide a tight seal under such conditions, gate valves have oftentimes been throught to be unacceptable for this type of service and that other valve designs such as globe valves, and the like, must necessarily be used. This has been the case even though the gate valve has the inherent advantage of providing a relatively small restriction to flow whenever the valve is fully opened.

It is therefore an object of the invention to provide a valve which can provide an effective seal when tightly closed and subsequently reopened without the need of applying excessive opening force.

It is another object of the invention to provide a gate valve having a predetermined relationship between the wedge angle of the gate and seat in order to provide an effective seal and to reduce the required opening force.

It is still another object of the invention to provide a gate valve having a valve seat which can be accurately positioned with respect to the gate and at the same time effectively sealed to prevent leakage.

It is a further object of the invention to provide a gate valve in which an end portion of the valve body member serves both to retain the valve seat tightly in place in the valve body and also to deliver fluid flow to the body member from one of a plurality of directions.

In one embodiment of the invention the valve comprises a body member having a flow passage therein. A valve member or gate is disposed within the body member and movable with respect to the flow passage between opened and closed positions. A pair of spaced seat members are also disposed within the body member. The valve member has two surfaces each being adapted to engage a surface of a seat member in the closed position in order to block the flow passage. The portion of the surface of the seat member extends at an angle to the axis of the body member which is a minor fraction of a degree greater than the angle to said axis at which a portion of the surface of the valve member extends when in the closed position. In this way it is insured that the valve member can be tightly closed to provide an effective seal and yet subsequently be opened without jamming.

In another embodiment of the invention the gate valve includes a wedge-shaped gate member having opposite surfaces disposed at a predetermined wedge angle and a pair of annular seat members each having a surface in facing relation with that of the other. The angle between the facing surfaces of the annular seat members is a minor fraction of a degree greater than the wedge angle of the gate member.

In still another embodiment of the invention seat inserts are sealed and secured in the body at a predetermined wedge angle relationship with respect to the gate by means of the end caps for the body member through which the flow passage extends.

In an additional embodiment of the invention the seat inserts which are disposed at the predetermined wedge angle relationship with respect to the gate are formed from plastic material thereby providing a tight seal for a variety of fluids subjected to a range of operating conditions.

In a further embodiment of the invention the end caps for the body member which seal and retain the valve seat inserts with respect to the valve body member are adapted to direct flow with respect to the body member from a variety of directions with respect thereto.

Other objects and advantages of the invention will become apparent from the following description taken in conjunction with the accompanying drawings in which:

FIG. 1 is a perspective view of the exterior of the valve of the invention;

FIG. 2 is a vertical section view taken along the line 2—2 in FIG. 1 and showing the wedge-shaped gate engaged with the valve seats in the closed position;

FIG. 3 is a fragmentary vertical section view taken along the line 3—3 in FIG. 2 and showing the gate in the closed position;

FIG. 4 is a horizontal section view taken along the line 4—4 in FIG. 2 and showing the arrangement for retaining the handle to the valve;

FIG. 5 is a vertical section view of the valve showing the gate in the open position;

FIG. 6 is a fragmentary vertical section view taken along the line 6—6 in FIG. 5 and showing the gate in the open position;

FIG. 7 is a fragmentary vertical section view taken along the line 7—7 in FIG. 6 and showing the means of connecting the valve stem to the gate;

FIG. 8 is an enlarged fragmentary vertical section view showing the angular relationship of the gate and one of the valve seats prior to closing;

FIG. 9 is an enlarged vertical section view showing the gate and one of the valve seats in the closed position;

FIG. 10 is a perspective view of a valve seat insert;

FIG. 11 is a fragmentary vertical section view showing an end cap of the valve which is adapted to direct flow with respect to the flow passage in the valve body member from a selected one of a plurality of directions.

The valve in accordance with the invention includes body member 20 having body 20a and bonnet 20b (FIG. 1). Within body 20a there is contained chamber 21 which provides a flow passage through the body. The chamber is adapted to receive valve member or gate 22. Counterbored or stepped openings 23 extend from faces 20c of the body into chamber 21 (FIG. 2). The seat member of the valve includes valve seat insert 24 which is of a stepped construction corresponding to that of stepped opening 23 (FIG. 10). The valve seat insert which is provided with annular valve seat 24a can be molded from plastic material such as nylon, Teflon, Kel-F, and the like. The valve seat insert contains central passage 24b extending therethrough which in conjunction with the central portion of cavity 21 provides the flow passage through the valve.

Annular valve seats 24a can be formed with a substantially semicircular cross section, that is formed in the shape of a portion of a torus. The surface of the annular valve seats, that is the portion of the valve seats which contacts gate 22 in the closed position is disposed at an angle to vertical axis 25 of the valve body or to a plane extending through vertical axis 25 slightly greater than the angle at which the wedge surface 22a of the gate is disposed to the same vertical axis (FIG. 8). Thus as shown in FIG. 8, angle 25a represents the wedge angle of the gate and angle 25b represents the corresponding angle of the seat. Consequently as the gate is brought into engagement with the valve seat, it can be understood that immediately prior to engagement, the clearance between the lower portion of the wedge surface of the gate and the valve seat is closer than that at the upper portion of the wedge surface and the gate. Due to the rounded form of the annular valve seats it can further be understood that the engagement between the seats and the gate is in the form of line contact. However since the seats and even the gate are elastically deformable, annular valve seats 24a flatten somewhat when the gate is tightened into the closed position (FIG. 9). Due to the fact that the angle 25b of the seats is slightly greater than angle 25a of the wedge, engagement of the gate first occurs at its lower portion and then extends upwardly as the gate is driven into the closed position until all portions of the seat are in contact with the gate. The progressive engagement resulting from this arrangement insures that a very effective seal is established between the gate and the seats and that the seal is sufficient regardless of whether it is subjected to high pressure or vacuum conditions. In addition the arrangement has been found to provide a tight seal even with extremes of temperature such as encountered in the handling of cryogenic fluids.

A further advantage of the arrangement wherein the angle of the valve seats is slightly greater than that of the gate is that upon attempting to open the valve after being tightly closed no jamming or sticking of the gate with respect to the seats occurs so that a reasonable amount of force readily opens the valve. Ease of opening occurs even after prolonged periods of closure and after the valve has been subjected to significant changes in temperature. Upon reopening the valve, annular valve seats 24a, due to the elastic properties of the seat material spring back to their rounded form and thus immediately become available to establish an effective seal upon the next closing of the valve.

In accordance with the invention tight sealing without subsequent sticking upon opening the valve has been achieved whenever wedge angle 25a of the gate as shown in FIG. 8 is 7°, that is the total included angle between the opposed surfaces of the gate is 14°. With a gate having angle 25a equal to 7°, valve seat inserts having a diameter of about ⅜" for central passage 24b are provided with a seat angle 25b equal to about 7°4'. The fact that the angle of the valve seats is a minor fraction of a degree greater than that of the gate, that is greater by 4', insure a tight seal and yet prevents sticking or jamming. Again with a gate having angle 25a equal to 7° in a valve having a central passage with about a four inch diameter, valve seat angle 25b is selected to be approximately a fraction of a degree greater, that is 7°11½'. Thus it can be seen that with larger size valves, the minor fraction of a degree by which the valve seat angle exceeds that of the wedge angle can be somewhat increased. Again with the four inch valve, the advantages described herein were obtained.

Thus it should be noted that in accordance with the invention, the preferred form of the valve includes a gate having a wedge angle of about 7° as shown in FIG. 8 and having a seat angle slightly greater than the gate angle, that is a seat angle which exceeds the angle of the gate by a minor fraction of a degree. Tests have shown that upon reducing the gate angle from about 7° to lower values that excessive wedging action can occur with the result that upon tightly closing the valve the gate can jam with the seat. On the other hand tests have shown that increasing the gate angle in excess of about 7° can result in a condition in which it is more difficult to obtain a satisfactory sealing action.

Valve seat inserts 24 are retained or secured in place in body 20a in the stepped openings 23 by means of end caps 26 which are mounted on the body by means of cap screws 27 (FIG. 2). Face 26a of the end cap bears against the insert and forces it into position within stepped opening 23. Shoulder 20d of body 20a is undercut along its face in order to provide an annular ridge or knife edge 20e at the edge portion of the shoulder adjacent to step 24c of the insert (FIG. 2). With this arrangement it can be seen that as the end cap forces the insert toward the body, shoulder 24c is pressed along knife edge 20e formed at shoulder 20d and thereby sets up a line contact condition which can locally and elastically deform the valve seat insert to provide an effective fluid seal. In this way fluid is prevented from passing about the outside diameter of the insert adjacent the valve seats.

To prevent the possibility of leakage passing along between face 20a of the body and the adjacent face of the end cap, the end cap is provided with concentric ridges 28 which locally deform the valve seat insert and thereby provide a plurality of fluid seals to block any tendency of leakage in this region. To facilitate assembly of the valve and to insure that the valve seat inserts are accurately positioned within the valve body the inserts are provided with dowels 29 which are adapted to engage dowel hole 30 in the valve body. For the case where the valve seat insert is of plastic material the dowel is molded integrally with the remaining portions of the valve seat insert (FIG. 10).

Gate 22 is moved with respect to the flow passage of the valve between the closed and open positions by means of handle 31 which is engaged by threads to stem 32.

The lower portion of the threaded stem is connected to extension 33 which in turn is connected to stem base 34. Stem base 34 is provided with ball end 35 which engages socket 22a of the gate (FIG. 7).

The valve is of the rising stem type since handle 31 can rotate but not move vertically with respect to cap 36 which is attached to bonnet 20b by screws 37 (FIG. 5). Retaining ring 38 which is circular in form secures the handle to the cap while permitting rotational motion of the handle with respect thereto since the ring is disposed in annular grooves 36a and 31a in the cap and handle, respectively (FIGS. 2 and 4). Handle 31 is provided with relieved portion 39 in order to expose ends 38a of the retaining ring to enable the ring to be deformed inwardly for removal of the handle from the cap.

In the closed position shown in FIGS. 2 and 3 ball end 35 engages the bottom portion of socket 22a and forces gate 22 into engagement with annular valve seats 24a. Pin 40 which is fixedly connected to gate 22 extends through a clearance opening 35a in the ball end. With this arrangement when the ball end is applying force to the gate, there is a clearance between the opening of the ball end and pin 40 with the result that no force is applied to the pin. Thus due to the spherical engagement of the ball end and socket, the wedge is not constrained by the stem and can freely position itself as determined by the valve seat and thereby produce a tight seal. Upon rotating the handle in the opposite direction and causing stem 32 to rise, the ball end engages pin 40 within clearance 35a and elevates the gate to the open position. In the open position as shown in FIGS. 5 and 6, the lower portion of the gate is adjacent the upper portion of the valve seat insert and is thereby confined from rotating with respect to the valve body so that the gate cannot interfere with the valve seat when the gate subsequently is closed.

In the open position shown in FIGS. 5 and 6 the fluid within the interior of the valve is exposed to the interior portion of bonnet 20b as well as the junction between cap 36 and bonnet 20b. Leakage is prevented between the cap and the bonnet by means of sealing ring 41 disposed in a groove in the upper portion of the bonnet. In order to prevent leakage of fluid between cap 36 and stem 32, extension 33 is enclosed by bellows 42 which is tightly sealed to cap 36 at its upper portion and to plate 43 at its lower portion. The plate in turn is sealed with respect to stem base 34. Thus the bellows provide a substantially cylindrical sealed flexible housing surrounding extension 33 and connecting it to the cap with the result that stem 32 is isolated from the interior portion of bonnet 20b. As shown in FIGS. 5 and 6 bellows 42 are compressed when the valve is operated to the open position.

In order to make the valve available for connection to lines or pipes which are disposed at an angle to the flow passage through valve seat inserts 24 and chamber 21, end cap 44 can be used in place of end cap 26 containing central opening 26a in line with the flow passage. End cap 44 contains angular passage 44a which has an opening at one side of the cap (FIG. 11). The opening of passage 44a adjacent face 44b of the end cap is centrally located with respect to the holes for cap screws 27 in order that end cap 44 may be placed at any one of four positions with respect to body 20a. The outer opening of passage 44a is directed downwardly as shown in FIG. 11. By using end caps 44 at both locations of the valve the valve is made adaptable for connection to a variety of line arrangements.

Although various embodiments of the invention have been shown and described herein it is understood that certain changes within the scope of the appended claims may be made by those skilled in the art without departing from the scope and spirit of the invention.

What is claimed:

1. A gate valve comprising a body member having a flow passage therein, a wedge-shaped gate member within said body member and movable with respect to said flow passage between open and closed positions, said wedge-shaped gate member having opposite surfaces disposed at a fixed predetermined wedge angle, and a pair of annular open elastometric seat members within said body member, said seat members being of deformable material, each of said pair of annular seat members having a surface in facing relation with one another and each of said opposite surfaces of said wedge-shaped gate member being adapted to engage a different one of said surfaces of the pair of annular seat members in the closed position and block said flow passage, each of said surfaces of the pair of annular seat members extending at an angle to a central axis disposed therebetween which is a minor fraction of a degree greater than said predetermined wedge angle so that the gate member first engages a portion only of the seat members, deforming such portion and tending thereby to deform the seat members throughout the remainder of the surfaces thereof prior to actual contact thereby of the gate member, whereby said wedge-shaped gate member can be tightly closed and subsequently opened without jamming with respect to said pair of seat members.

2. A gate valve comprising a body member, having a flow passage therein, a wedge-shaped gate member having a free narrow end and a wider end within said body member and movable with respect to said flow passage between open and closed positions, said wedge-shaped gate member having relatively fixed opposite surfaces disposed at a fixed predetermined included angle, and a pair of deformable elastometric seat members within said body member, each of said pair of seat members having a surface in facing relation with one another and each of said opposite surfaces of said wedge-shaped gate member being adapted to engage a different one of said surfaces of the pair of seat members in the close position and block said flow passage, each of said surfaces of the pair of seat members extending at an included angle to each other which is a fraction of a degree greater than said predetermined included angle, whereby in its closing motion the gate member contacts the surfaces of the seat members adjacent its free end prior to contact thereof adjacent its wider end, thus causing the seat members to be deformed by the tip and to draw inwardly the portions of the seat means adjacent the wider end of the gate member so that said wedge-shaped gate member can be tightly closed and subsequently opened without jamming with respect to said pair of seat members.

References Cited by the Examiner

UNITED STATES PATENTS

| | | | |
|---|---|---|---|
| 930,101 | 8/09 | Stevens | 251—86 X |
| 1,552,614 | 9/25 | Kiley | 251—327 |
| 2,401,377 | 6/46 | Smith | 251—327 |
| 2,626,775 | 1/53 | Lange et al. | 251—328 |
| 2,636,713 | 4/53 | Hamer | 251—328 X |
| 2,740,423 | 4/56 | Stillwagon | 251—361 X |
| 3,078,871 | 2/63 | Magos | 251—329 X |

M. CARY NELSON, *Primary Examiner.*

LAVERNE D. GEIGER, *Examiner.*